(12) United States Patent
Larson et al.

(10) Patent No.: US 10,982,162 B2
(45) Date of Patent: Apr. 20, 2021

(54) HIGH PROTEIN ORGANIC MATERIALS AS FUEL AND PROCESSES FOR MAKING THE SAME

(71) Applicant: AKBEV GROUP, LLC, Juneau, AK (US)

(72) Inventors: Geoffrey L. Larson, Juneau, AK (US); Curtis Holmes, Juneau, AK (US); Brandon Michael Smith, Chico, CA (US); David D. Wilson, Juneau, AK (US)

(73) Assignee: AKBEV GROUP, LLC, Juneau, AK (US)

( * ) Notice: Subject to any disclaimer, the term of this patent is extended or adjusted under 35 U.S.C. 154(b) by 0 days.

(21) Appl. No.: 16/345,151

(22) PCT Filed: May 1, 2017

(86) PCT No.: PCT/US2017/030420
§ 371 (c)(1),
(2) Date: Apr. 25, 2019

(87) PCT Pub. No.: WO2018/080593
PCT Pub. Date: May 3, 2018

(65) Prior Publication Data
US 2019/0284491 A1    Sep. 19, 2019

Related U.S. Application Data

(63) Continuation-in-part of application No. 15/469,074, filed on Mar. 24, 2017, now Pat. No. 10,781,388, and
(Continued)

(51) Int. Cl.
*C10L 5/46*     (2006.01)
*C10L 5/44*     (2006.01)
(Continued)

(52) U.S. Cl.
CPC .............. *C10L 5/46* (2013.01); *C10L 5/366* (2013.01); *C10L 5/42* (2013.01); *C10L 5/445* (2013.01);
(Continued)

(58) Field of Classification Search
CPC .. C10L 5/46; C10L 5/445; C10L 5/366; C10L 2290/148; C10L 2290/18;
(Continued)

(56) References Cited

U.S. PATENT DOCUMENTS 2,494,544 A    1/1950  Erlich
4,290,269 A    9/1981  Hedstrom et al.
(Continued)

FOREIGN PATENT DOCUMENTS

EP    2136138       12/2009
EP    2136138 A2    12/2009
(Continued)

OTHER PUBLICATIONS

International Search Report for PCT Patent Application No. PCT/US2016/059528 dated Feb. 15, 2017 and Written Opinion for PCT Patent Application No. PCT/US2016/059528 dated Jun. 8, 2018.
(Continued)

*Primary Examiner* — Cephia D Toomer
(74) *Attorney, Agent, or Firm* — Emerson, Thomson & Bennett, LLC; Roger D. Emerson; Peter R. Detorre

(57) ABSTRACT

A process of making a fuel product from a non-combustible high protein organic material such as a biological by-product or waste material. The moisture content of the high protein organic material is mechanically reduced and dried to reduce the moisture content to less than ten percent (10%). The high protein organic material is pulverized to a particle size of less than about 2 mm. The high protein organic waste material is fed into a combustion chamber and separated
(Continued)

during combustion such as by spraying of the high protein organic waste material within the combustion chamber. Temperature and nitrogenous hydrocarbon combustion reactions within the combustion chamber are also controlled by injection of steam within the combustion chamber.

20 Claims, 2 Drawing Sheets

Related U.S. Application Data a continuation-in-part of application No. PCT/US2016/059528, filed on Oct. 28, 2016, which is a continuation-in-part of application No. 14/756,904, filed on Oct. 28, 2015, now Pat. No. 10,364,400, which is a continuation-in-part of application No. 13/199,505, filed on Sep. 1, 2011, now Pat. No. 9,447,354, said application No. 15/469,074 is a continuation-in-part of application No. 14/756,904, filed on Oct. 28, 2015, now Pat. No. 10,364,400.

(51) Int. Cl.

| | | |
|---|---|---|
| C10L 5/42 | (2006.01) | |
| C10L 5/36 | (2006.01) | |
| F23G 5/04 | (2006.01) | |
| F23G 5/32 | (2006.01) | |
| F23G 5/44 | (2006.01) | |
| F23G 7/10 | (2006.01) | |

(52) U.S. Cl.
CPC ............. *F23G 5/04* (2013.01); *F23G 5/32* (2013.01); *F23G 5/444* (2013.01); *F23G 7/10* (2013.01); *C10L 2200/0259* (2013.01); *C10L 2200/0469* (2013.01); *C10L 2200/0484* (2013.01); *C10L 2290/02* (2013.01); *C10L 2290/06* (2013.01); *C10L 2290/08* (2013.01); *C10L 2290/148* (2013.01); *C10L 2290/18* (2013.01); *C10L 2290/28* (2013.01); *F23G 2201/20* (2013.01); *F23G 2201/80* (2013.01); *F23G 2203/10* (2013.01); *F23G 2203/107* (2013.01); *F23G 2209/262* (2013.01)

(58) Field of Classification Search
CPC ..... C10L 2200/0469; C10L 2200/0484; C10L 2290/02; C10L 2290/08; C10L 2290/06; C10L 2290/28; C10L 2200/0259; F23G 5/04; F23G 5/32; F23G 5/444; F23G 7/10; F23G 2201/20; F23G 2201/80; F23G 2203/10; F23G 2209/262; F23G 2203/107

See application file for complete search history.

(56) References Cited

U.S. PATENT DOCUMENTS

| | | | |
|---|---|---|---|
| 4,464,402 A | 8/1984 | Gannon | |
| 5,536,650 A | 7/1996 | Versteegh | |
| 5,637,336 A | 6/1997 | Kannenberg et al. | |
| 6,167,636 B1 | 1/2001 | Kepplinger et al. | |
| 9,447,354 B2 | 9/2016 | Larson et al. | |
| 9,708,937 B2 | 7/2017 | Janicki | |
| 10,247,049 B2 | 4/2019 | Janicki | |
| 2005/0166811 A1 | 8/2005 | Alexakis et al. | |
| 2008/0035036 A1* | 2/2008 | Bassani | C10L 5/42 |
| | | | 110/224 |
| 2013/0055622 A1 | 3/2013 | Larson et al. | |
| 2013/0091761 A1 | 4/2013 | Willner | |
| 2014/0352854 A1 | 12/2014 | White | |

FOREIGN PATENT DOCUMENTS

| | | | |
|---|---|---|---|
| JP | S54120423 A | 9/1979 | |
| JP | 2001241848 | 9/2001 | |
| PT | 104494 | 3/2010 | |
| WO | 9822751 | 5/1998 | |
| WO | 2009049385 | 4/2009 | |
| WO | 2010117288 | 10/2010 | |
| WO | WO2017075494 | * 5/2017 | |

OTHER PUBLICATIONS

Written Opinion for PCT Patent Application No. PCT/US2017/030420 dated Sep. 18, 2017.
Sky News Article dated Feb. 1, 2010, Author Gerard Tubb, entitled "Heineken Forced to Can Green Power Plants", 2 pages, copyright 2011 BSKYB.
Wartsila Corp. Press Release Mar. 3, 2008, entitled "Wartsila Delivers Worlds First BioPower Plant Using Brewery Spent Grain", copyright 2010 Wartsila.
McCabe, John T. "The Practical Brewer", Amer. Assn. of Cereal Chemists; 3rd Edition (Apr. 1, 1999).
Trageser, Claire. "What do Craft Brewers Do With Some of Their Waste? Feed it to the Cows", published Apr. 9, 2018. https://www.kpbs.org/news/2018/apr/09/what-do-craft-brewers-do-some-their-waste-feed . . . .
Spengler, Jessica. "Using Spent Grain Responsibly". https://beverage-master.com/article/using-spent-grain-responsibly/ (Jan. 31, 2017).
Kurzrock, Dan. "What Usually Happens to Brewers' "Spent" Grain?" https://www.regrained.com/blogs/upcyclist/what-usually-happens-to-brewers-spent-grain (Jun. 13, 2017).
Fuller, Janet Rausa. "Boom in Breweries leads to Growing Problem: What to do With Spent Grain?" https://www.dnainfo.com/chicago/20141020/chicago/boom-breweries-leads-growing-pro . . . (Oct. 20, 2014).
Mitchell Dushay & Phil Lewis. "Business Study of Alternative Uses for Brewers' Spent Grain" Final Project Report. (Apr. 28, 2011).
Brewers Association Solid Waste Reduction Manual (Mar. 25, 2013).
Zebell, Lorenza, et al. "Spent Grain Creative Waste Solutions". (May 16, 2016).
Lynch, Kieran M., et al. "Brewers' Spent Grain: A Review with an Emphasis on Food and Health" https://onlinelibrary.wiley.com/doi/full/10.1002/jib.363 (Oct. 28, 2016).
Weger, Andreas, et al. "Solid Biofuel Production by Mechanical Pre-Treatment of Brewers' Spent Grain", The Italian Association of Chemical Engineering (Apr. 19, 2014).
Greer, Diane. "Feeding it Back", http://biomassmagazine.com/articles/1735/feeding-it-back (Jun. 20, 2008).
"Spent Grain Burns into Clean Energy" http://www.energy-enviro.com/demo47/index.php?PAGE=1863&PRINT=yes (Jun. 17, 2008).
Beharry, Lyndon Martin W. "MCS-APB Tiger Brewery Brewers Spent Grains Question" https://www.slideshare.net/LMBeharry/2015-0913-mcsapbspentgrains (Sep. 11, 2015).
Supplementary European Search Report, dated May 8, 2020 for European Application No. 17864641.0-1104/3532569.

* cited by examiner ated U.S. Pat. No. 10,364,400, which in turn is a continuation-in-part of
HIGH PROTEIN ORGANIC MATERIALS AS FUEL AND PROCESSES FOR MAKING THE SAME The present application is a National Stage entry of PCT Application No. PCT/US17/30420 filed on May 1, 2017 which is a continuation-in-part of U.S. application Ser. No. 15/469,074 filed on Mar. 24, 2017, which is a continuation-in-part of PCT Application No. PCT/US16/59528 which in turn is a continuation-in-part of U.S. application Ser. No. 14/756,904 filed on Oct. 28, 2015, now issued as U.S. Pat. No. 10,364,400, which in turn is a continuation-in-part of U.S. application Ser. No. 13/199,505 filed on Sep. 1, 2011, now issued as U.S. Pat. No. 9,447,354, all of which are herein incorporated by reference in their entireties.

TECHNICAL FIELD

The present disclosure generally relates to organic materials that are problematic to burn because of their high protein content. Such materials include bio-solids from waste water treatment plants; high protein fermentation waste and waste by-products; high protein waste and by-products from agricultural sources of oil production; and high protein meat production waste, high protein meat by-products, high protein biological waste by-products and high protein animal excreta. These potential fuels are too high in protein to allow for suitable combustion under typical conditions and to allow for regulatory compliant emission characteristics in combustion chambers such as those used to make Steam. While these high protein organic materials can burn they are unable to sustain unassisted auto combustion in air once ignited. These high protein organic materials are traditionally considered non-auto combustible. While wood products and petroleum products can sustain unassisted auto combustion once ignited in air, these high protein organic materials will stop burning if additional fuel is not used to assist in their incineration. These high protein organic materials maybe able to be burnt (incinerated) however, they are not able to sustain an auto combustible state without additional traditional fuels being use (e.g. wood products, paper products, cardboard, high cellulosic bio-mass such as grass or hay or chaff etc., or hydro carbons such as fuel oil, coal or natural gas). Accordingly, the present disclosure relates to a novel and improved process for making a combustible fuel product from a traditionally considered non-auto combustible organic material that is high in protein. The present disclosure also relates to the novel use of high protein organic materials as a primary fuel source for a furnace, steam boiler, incinerator and other combustion applications.

BACKGROUND

Certain high protein organic materials are known for being problematic when used as a source of fuel. Such materials may be ignited, however, they have not been previously shown to auto-combust as previous attempts to use these high protein materials as a primary fuel for combustion results in incomplete combustion and/or the generation of a large amount of smoke which is outside of regulatory compliance limits, for example, exceeding 20% opacity averaged over 6 minutes (i.e., more than 20% of light is blocked by emissions over any 6 minute interval).

Consequently, the only way these high protein organic materials could be used for continued combustion over an extended period of time is when these materials constituted only a minor component of the total fuel used in the combustion chamber. Ultimately, traditionally high protein organic materials needed other traditional flammable materials (e.g., wood products, paper products, cardboard, high cellulosic bio-mass such as grass or hay or chaff etc., or hydro carbons such as fuel oil, coal or natural gas) to constitute the majority of the fuel that is used for combustion. These high protein organic materials, however, present great potential for reducing operating costs of fuel operated systems, conserving use of other fuel sources and for disposing unwanted materials. Examples of high protein materials which have been traditionally problematic as alternative fuel sources include but are not limited to grains such as spent grain and distillers grains, hops residues, yeast residues, solid waste material from animals, bio-solids from waste water treatment plants, high protein animal meat processing by-product (e.g., meat and bone meal, feathers, feather meal, animal excreta) and other high protein organic wastes and high protein organic by-products.

Spent grain from the brewing of alcoholic products has been used as a food product such as cattle feed. In some of the processes used to make the food product, it is known to reduce the moisture content of the spent grain through press and/or drying operations. Although there have been some attempts to use spent grain as a major part of the fuel used for a steam boiler, such attempts have been unsuccessful due to insufficient or failure of combustion and excessive smoke produced thereby. Although there have been some successful attempts to use spent grain as a minor part of the fuel for a steam boiler or combustion system, attempts to use spent grain as the sole or primary fuel have been unsuccessful due to insufficient or failure of combustion and excessive smoke produced thereby.

Similar problems have been shown to exist with respect to the use of bio-solid waste materials from waste water treatment plants, animal solid waste, hops residues, oil seed pulp meal, high protein animal meat processing by-product (e.g., meat and bone meal, feathers, feather meal and animal excreta) and other high protein organic wastes as a primary fuel source. One feature that is common to these types of organic materials is that each of these materials contain a relatively large amount of protein and other compounds which cross link and agglomerate during combustion resulting in a relatively incomplete and inefficient combustion process. Therefore, what is needed is a process which can reduce the extent of the protein cross linking and other cross-linking reactions which result in the formation of larger agglomerated masses that occurs within these materials during combustion to render them suitable for use as an alternative fuel source.

Accordingly, the present disclosure provides a novel process for making a fuel product from a high protein organic material such as spent grain, distillers grains, hops residue, bio-solids from waste water treatment plants, solid animal waste, oil seed pulp meal, high protein animal meat processing by-product (e.g., meat and bone meal, feather meal, animal excreta) and other high protein organic wastes or combinations thereof. The present disclosure also provides a novel and improved process for making such fuel products. The fuel products included herein can be used in a furnace, a steam boiler, an incinerator or other fireboxes in conformance with present day environmental and emission laws and regulations. The fuel products included herein can also be successfully used as the sole or primary fuel for a steam boiler such as that used in the brewing process as well as other processes, drying operations, energy generation and other applications.

The present disclosure further provides a novel and improved process for making high protein organic materials as a fuel product using machines or devices that are commercially available in industry.

The present disclosure further provides heat for a brewing processes and other heat-required applications using a steam boiler fueled by novel high protein organic material as a fuel product made from the spent grain, distillers grains and hops residues by-products of the brewing industry.

The present disclosure also provides for fuel operated systems of various applications which incorporate the use of novel high protein organic materials as a fuel product made from bio-solids from a waste water treatment plant.

The present disclosure also provides for fuel operated systems of various applications which incorporate the use of novel high protein organic materials as a fuel product made from oil seed pulp meal.

The present disclosure also provides for fuel operated systems of various applications which incorporate the use of novel high protein animal meat processing by-products (e.g., meat and bone meal, feather meal, animal excreta)

The present disclosure also provides for fuel operated systems of various applications which incorporate the use of novel fuel products made from any high protein organic materials.

The present disclosure also provides for a process for combusting a traditionally non-auto-combustible high protein organic material using the non-auto-combustible high protein organic material as the sole or primary source of fuel, that is, without the use of a traditional combustible fuel or additives to aid in combustion (which include for example wood products, paper products, cardboard, high cellulosic bio-mass such as grass or hay or chaff etc., or hydro carbons such as fuel oil, coal or natural gas).

SUMMARY

Provided is a process for making a combustible fuel product from a non-auto-combustible organic material for a combustion system having a low nitrogen oxides (NOX) production and a low emissions opacity. The process includes the following steps in any order: providing a non-auto-combustible organic material, wherein the organic material is a high protein organic material having a protein content of about 10% (dry weight basis) or greater; optionally mechanically removing liquid and soluble components from the high protein organic material; optionally, applying heat to dry the organic material to reduce its moisture content to ten percent (10%) or less by weight; pulverizing the high protein organic material to reduce the high protein organic material to a particle size of less than 2 mm; separating particles of the high protein organic material during a combustion phase to inhibit their cohesion into an integrated mass by spraying the particles into a combustion chamber; simultaneously injecting steam into the combustion chamber to enhance combustion characteristics of the high protein organic material in a regulatory compliant manner; and, allowing protein thermal decomposition by-products to react with nitrogen oxides (NOX) within the combustion chamber to form water ($H_2O$) and nitrogen ($N_2$), wherein the NOX production ranges from about 100 parts per million (ppm) to about 150 parts per million (ppm) and wherein the opacity of the emissions is about 20% or less on average for every 6-minute interval. In further aspects of the present process, the NOX production is less than 150 parts per million (ppm) whereas in other aspects, the NOX about 150 parts per million (ppm) or less. In certain aspects of the present process, the opacity of the emissions is about 20% or less on average for every 6-minute interval and in further aspects of the present process, the opacity of the emissions is about 6% or less on average for every 6-minute interval.

According to one aspect of the process, pulverizing, pressing, applying heat to dry the high protein organic material particles, spraying particles into the combustion chamber and injecting steam into the combustion chamber degrades the proteins contained within the particles and denatures them by allowing nitrogen cross-linking and other cross-linking reactions to occur within the particles, allowing the particles to complete all of the cross-linking ability before the particles contact other particles.

According to another aspect of the process, cross-linking of the high protein organic material particles is prevented by prematurely initiating cross-linking reactions of the nitrogen bonds and other cross linking reactions while the particles are being agitated and wherein the high protein organic material particles no longer adhere to each other, thereby arresting the particles tendency to adhere to each other within the combustion chamber via nitrogen bond cross-linkage and other cross-linking reactions.

According to another aspect of the process, the step of separating the high protein organic material by spraying the processed high protein organic material into the combustion chamber is effected through use of a pneumatic stoker.

According to another aspect of the process, spraying the particles of the high protein organic material into the combustion chamber by the pneumatic stoker keeps the particles separated in the combustion chamber long enough to allow heat transfer provided by the combustion process to quickly dry and then degrade proteins present within the high protein organic material and to prevent nitrogen cross linking and other cross linking reactions between the particles that would have the particles adhere to each other.

According to another aspect of the process, the particles of the high protein organic material are separated and dispersed within the combustion chamber and ignited and burned while in suspension and separated from each other before they land and adhere to each other.

According to another aspect of the process, the non-auto-combustible high protein organic material is rendered combustible without the addition of other combustible fuels or additives.

According to another aspect of the process, protein thermal decomposition by-products include ammonia, nitrogenous hydrocarbons and nitrogen-based compounds and wherein injection of ammonia, nitrogenous hydrocarbons and nitrogen-based compounds into the combustion chamber is not required to lower NOX production.

According to another aspect of the process, the step of removing water, moisture and other soluble components from the biological waste material incorporates the use of flocking agents, centrifuges, filter beds and dewatering separators.

According to another aspect of the process, the high protein organic material is a biological waste or by-product material.

According to another aspect of the process, the biological waste or by-product material originates from waste water treatment activated sludge waste. The process according to this aspect includes the following order of steps: 1) providing a biological waste material or by-product comprising a waste water treatment activated sludge having a protein content of about 10% or greater, on a dry weight basis (DWB) or in some cases, greater than 20%, on a dry weight basis (DWB); 2) removing water, moisture and other soluble components from the biological waste material or by-product; 3) drying the biological waste material or by-product to reduce the moisture content to 10% or less by weight; 4) pulverizing the biological waste material to reduce the particle size to be less than 2 mm; and 5) separating particles of the biological waste material or by-product during the combustion phase to inhibit their cohesion into an integrated mass by spraying the particles into the combustion chamber and 6) simultaneously injecting steam into the combustion chamber, wherein steam is injected to modify and control combustion reactions by reacting with nitrogen within proteins to form intermediate nitrogenous-based protein thermal combustion products which help to maintain regulatory compliance of combustion emissions.

According to another aspect of the process, the step of removing of water from the biological waste material or by-product comprises application of heat.

According to another aspect of the process, the step of drying biological waste or by-product material comprises drying the biological waste material or by-product in a heated drier, a heated progressing filter belt or other suitable drier and wherein the step of pulverizing the biological waste material or by-product comprises subjecting the biological waste material or by-product to a mill.

According to another aspect of the process, the high protein biological waste material or by-product is pulverized prior to drying to ensure that the high protein biological waste material has a particle size less than 2 mm.

According to another aspect of the process, the high protein organic biological waste material is hops residue. The process according to this aspect includes the following steps in the following order: 1) extracting oils and other compounds from the ground hops utilizing mechanical separation techniques or CO2 extraction to obtain a high protein hops waste residue having a protein content of about 25 to about 30 weight percent, on a dry weight basis (DWB); 2) providing the hops waste residue 3) drying the hops waste residue; 4) grinding the hops waste residue into a powder by pulverizing the hops waste residue to ensure that particles of the hops waste residue have a particle size of less than 2 mm; 5) agitating the hops waste residue during a combustion phase to separate particles of the hops waste residue by spraying the particles into the combustion chamber to inhibit their cohesion into an integrated mass and 5) simultaneously injecting steam into the combustion chamber to enhance the combustibility of the high protein organic material.

According to another aspect of the process, the step of pulverizing the hops waste residue includes subjecting the hops residue to a mill and wherein the step of drying the hops waste residue comprises the application of heat.

According to another aspect of the process, the high protein organic material is a high protein waste or meal from an agricultural source of oil production, waste by-products and by-products from an oil seed pulp processing.

According to another aspect of the process, the biological waste material comprises an oil seed pulp waste residue. The process for making a combustible fuel product from oil seed pulp waste residue according to this aspect includes the following order of steps: 1) obtaining an extracted high protein oil seed pulp waste residue having a protein content of about 35%, on a dry weight basis, a moisture content of ten percent (10%) or less and a particle size less than 2 mm, wherein oil from the oil seed pulp waste residue may or may not be preliminarily extracted; and 2) separating and agitating particles of the oil seed pulp waste residue during the combustion phase to inhibit their cohesion into an integrated mass while simultaneously injecting steam into the combustion chamber.

According to another aspect of the process, the process includes the steps of drying and pulverizing the oil seed pulp waste residue to ensure a moisture content of ten percent (10%) or less and a particle size of less than 2 mm.

According to another aspect of the process, the high protein organic material is one of a high protein animal excreta or a high protein animal meat processing by-product or waste. The process according to this aspect includes the following steps: obtaining a pre-processed or "as is" high protein animal excreta or high protein animal meat processing by-product or waste which is non-auto-combustible, wherein the animal excreta has a protein content ranging from about 20% to about 60% (dry weight basis) and the animal meat processing by-product or waste has a protein content ranging from about 35% to about 85%, on a dry weight basis; removing liquid and soluble components from the high protein organic material; applying heat to dry the high protein organic material to reduce its moisture content to ten percent (10%) or less by weight; grinding the high protein organic material to reduce the high protein organic material to a particle size of less than 2 mm; separating particles of the high protein organic material during a combustion phase to inhibit their cohesion into an integrated mass by spraying the particles into a combustion chamber; simultaneously injecting steam into the combustion chamber to enhance combustion characteristics of the high protein organic material in a regulatory compliant manner; and, allowing protein thermal decomposition by-products to react with nitrogen oxides (NOX) within the combustion chamber to form water ($H_2O$) and nitrogen ($N_2$).

SUMMARY OF THE DRAWINGS

Other objects and advantages of the present disclosure will become apparent from the following detailed description taken in conjunction within the attached drawings, as shown within FIG. 1 and FIG. 2, which include two schematic flow diagrams of the process of the present disclosure.

DETAILED DESCRIPTION

The present disclosure provides a novel fuel product made from a high protein non-auto-combustible organic material. Examples of non-auto-combustible organic materials which may be used as a fuel source include spent grain, hops residues, solid animal waste, biological waste materials including bio-solid waste originating from waste water treatment plant bio-solid sludge waste oil seed pulp meal, distillers grains, feather meal (a by-product of the poultry industry), high protein animal meat processing by-product (e.g., meat and bone meal, feathers, feather meal, and animal excreta) and other high protein organic materials as a fuel sources that are processed to change its composition, structure, handling and combustion environment in order to sufficiently increase its combustibility. In certain aspects of the process, these changes in composition, structure, handling, and combustion environment allow the high protein non-auto-combustible waste material to be used as a primary or sole fuel product in accordance with air quality standards and other environmental regulations and law.

The high protein waste materials mentioned above may be categorized into the following four general types of waste materials: 1) bio-solids from waste water treatment plants (containing from 10% protein to 30% protein on a dry weight basis); 2) high protein fermentation waste and waste by-products (examples include but are not limited to spent grain, hop residue, yeast and protein precipitates) (containing from 20% protein to 50% protein on a dry weight basis); 3) high protein waste and by-products from agricultural sources of oil production and seed processing, waste by-products and by-products (examples include but are not limited to sources of oil seed pulp meal (also called seed meal) including cotton seed pulp (or cotton seed meal), sunflower seed pulp (or sunflower meal), soybean pulp and hulls, olive pulp, coconut pulp, cotton seed, canola oil, vegetable oil in general, wheat middlings, corn gluten mill feed, hominy feed and combinations thereof) (containing from 30% protein to 50% protein on a dry weight basis); and 4) high protein animal meat processing by-product (examples include but are not limited to meat and bone meal, feathers, feather meal and animal excreta) (containing from 35% protein to over 80% protein on a dry weight basis).

Figure 1:
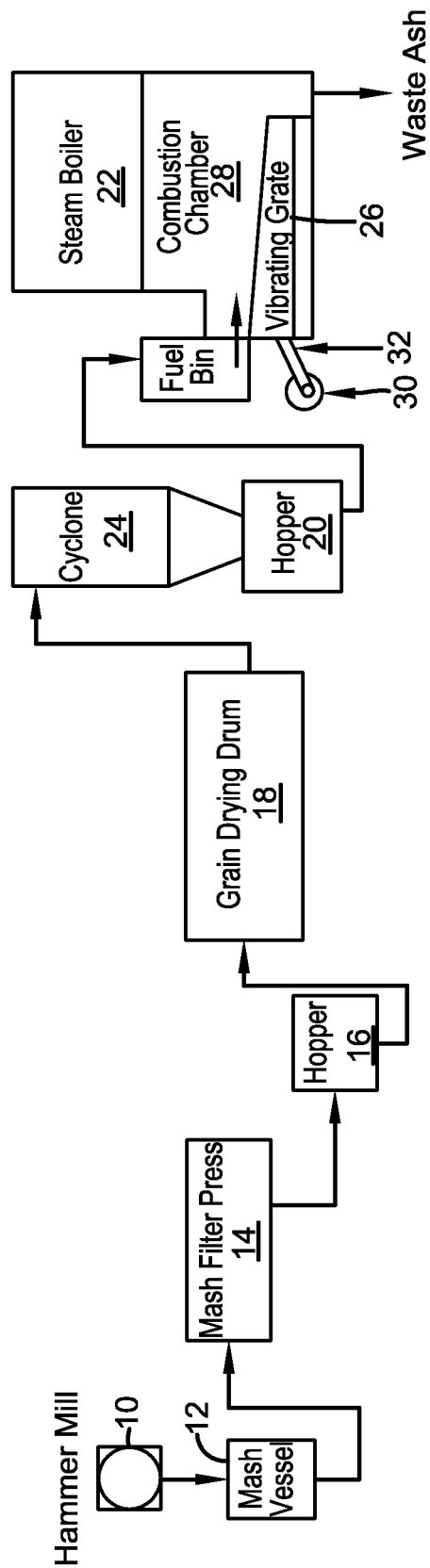

Sources of spent grains, distillers grains and hops residues include breweries, distilleries and ethanol production facilities. High protein waste products made from grain (e.g., spent grain) hops residues and distillers grains are a by-product of a brewing process. In one form of the present disclosure, a high protein fermentation waste from spent grain is obtained primarily as a malt by-product of a beer brewing process which is processed to yield a high protein organic material which may be used as a fuel. A summary of this process is shown for illustrative purposes within FIG. 1 which for exemplary purposes describes the processing of spent grain into a combustible fuel, although various aspects of the process illustrated within FIG. 1 and described herein may also be applicable to processing other high protein organic materials into a combustible fuel. During brewing, the grain is first crushed or pulverized by a hammer mill 10 to reduce it to a finely ground median particle size generally less than 2 mm. In other aspects of the present teaching, the grain may be reduced to a median particle size of 0.25 mm to 0.6 mm with less than 1% of the grain being greater than 2 mm, however, this reduction in particle size is not necessary for combustion to occur as a higher protein content generally implies an improved combustion process for smaller particle sizes. The median, particle size between 0.25 mm to 0.6 mm means that fifty percent (50%) of the grain particle mass is greater than and fifty percent (50%) of grain particle mass is smaller than the median size. Pulverizing the grain reduces adhesion among various elements of the grain which normally serves to solidify the grain into one cohesive and air-impermeable mass upon combustion. It also increases the surface area of the particles to facilitate the reduction of moisture and increase combustibility. In one form of the present disclosure, the mill used in this instance is a Meura ClassicMill CLM3 model fine grinding hammer mill with horizontal shaft. This grinding process to obtain the desired particle size, for combustion, can be accomplished before or after the brewing and drying process, prior to combustion. Although the Meura ClassicMill CLM3 mill model is mentioned above, any other suitable device known to those of ordinary skill in the art may be used to pulverize the grain.

After pulverizing, the grain is moved such as by a drag chain conveyor to a mash vessel 12 and hydrated from which it may optionally be moved such as by a centrifugal pump to a mash filter press 14 where it is pressed. This step removes water mechanically from the grain material which increases the overall thermal efficiency of the process and allows excess heat to be available for other uses within the process. For example, heat vaporization of excess water wastes the application of heat energy which might be redirected for other beneficial uses such as steam generation for industrial use.

The latter process steps reduce the moisture content and removes soluble sugar and protein contents which also act as adhesives during subsequent drying of the spent grain. In certain aspects of the present teaching, the moisture content is reduced to below 65%. With these compounds reduced, the tendency of the grain particles to establish cohesion and structural integrity during subsequent drying and burning as a fuel is significantly reduced. The fact that the spent grain has been pulverized, also enables the cloth to act as a filter through which the moisture passes when the spent grain is pressed on the cloth. The latter also reduces the energy needed to further dry the spent grains before its use as fuel. In one preferred process of the present disclosure, a Meura 2001 mash filter press available in the industry may be used. However, other methods and devices may also be used to press the moisture and other soluble compounds from the spent grain as described above. Due to the compression of the spent grains to remove moisture, it is preferred that air pulses be directed into the spent grain on the filter cloth before opening the filter to help break up the spent grain cake to facilitate release of the spent grain from binding to the filter cloth when the filter is opened. The spent grain is then moved to a hopper 16 by a pneumatic pump from which it is moved to a grain drying drum 18 by an auger and pulled through the drier drum by a pneumatic fan, for example.

The next step in the process is that the spent grain is dried to further reduce the moisture content to ten percent (10%) by weight or less. In one embodiment, a rotating dryer drum 18 is used to receive the spent grain and is rotated while heated air in the drum subjects the spent grain to the desired drying temperature while the drum is rotating. The reduced finely ground spent grain particles helps speed up the drying process to reach the desired moisture level preferably ten percent (10%) or less by weight in order to increase its combustibility. A suitable dryer drum that can be used is one made by Baker Rullman which is readily available on the market. Other methods of drying the spent grain to sufficiently reduce its moisture content may of course be used. Also, grinding the dried spent grain can be done after the drying process to achieve the desired particle size distribution.

After having been processed as described above, the spent grain can be stored in a hopper 20 for immediate or eventual use as a primary fuel source. For example, the spent grain may be introduced in a boiler 22 used in a brewery to produce steam for heating the brew house vessels. In the embodiment shown in FIG. 1, the dried spent grain is moved to the hopper 20 by a cyclone 24. An auger is then used to convey the spent grain fuel into the combustion chamber 28. For combustion within the boiler 22 (e.g., a steam boiler), the spent grain is moved in any suitable manner, from the fuel bin through the combustion chamber 28, such as down an inclined grate 26 positioned within the combustion chamber 28 while the grate 26 is agitated or vibrated. In one process, a motor 30 connected by linkage 32 to the grate 26 is employed to vibrate the grate as the spent grain is moved through the combustion chamber 28. In another process, illustrated within FIG. 2, steam is injected into the combustion chamber 28 from a steam generator 40 during the combustion process. The timing frequency and intensity of the inclined grate agitation can be controlled and adjusted as needed for best combustion. The angle of the inclined grate being combined with the agitation or vibration of the grate helps to keep the spent grain moving through the combustion chamber while it burns to inhibit cohesion and solidification of its particles. Under normal circumstances, spent grain that has not been processed as described above tends to form a sponge-like impermeable, cohesive mass when heated which inhibits the transfer of oxygen and heat to the interior of the mass and thereby prevents sufficient combustion and generates large amounts of smoke while also causing an excessive buildup of material within the combustion chamber. In contrast, the process of the present disclosure not only sufficiently reduces the moisture content and particle size of the spent grain, soluble proteins and sugars which act as binding agents during heating, but it also, through agitation and separation, breaks up the nitrogen bond cross linking and other cross-linking reactions (for example, non-nitrogen based cross-linking such as cross linking of soluble sugars during sugar decomposition) that occurs during thermal degradation of protein, all of which can inhibit combustion. In addition, the vibration and continual movement of the spent grain through the combustion chamber further breaks up the spent grain into smaller clumps thereby avoiding cohesion of the particles into an, agglomerated cohesive mass. This agglomeration of particles prevents sufficient heat transfer and diffusion characteristics for oxygen and water with the nitrogenous hydrocarbon combustion reactions of the agglomerated protein mass. In one process of the present disclosure, a King Coal combustion chamber may be used. After combustion, waste ash is collected and disposed of. The process of the present disclosure provides effective combustion of the spent grain to allow it to be used as the sole source of fuel, that is, without the need for combining it with a readily combustible fuel source such as wood, wood chips, wood by-products, fuel oil, natural gas, coal or other combustibles or additives to aid in combustion.

Figure 2:
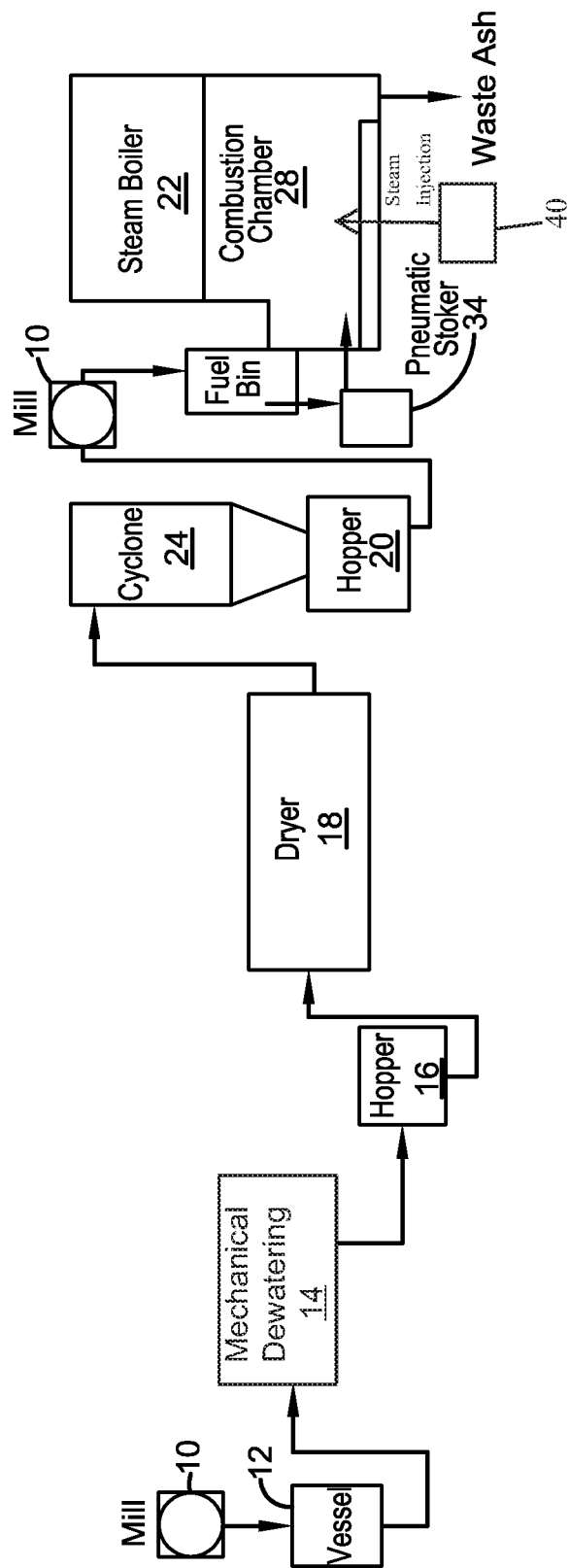

In another process of the present disclosure, rather than separating the spent grain particles during combustion by vibrating or agitating the particles through means of the grate 26, linkage 32 and motor 30 as described above, the spent grain particles are separated and disbursed during combustion by being introduced or fed and sprayed into the combustion chamber by a device such as a pneumatic stoker. In one embodiment, as shown in FIG. 2, a pneumatic stoker 34 is connected to the combustion chamber 28 by a linkage 32 to blow the spent grain through the combustion chamber 28. The pneumatic stoker sprays the spent grain particles or particles of another type of high protein organic material into the combustion chamber thereby separating and disbursing the particles. The particles are ignited and burned while they are in suspension and separated from each other and before they can come into contact with and adhere to each other on the grate, bed, other surface or while suspended. This method also increases heat transfer to fully dehydrate the particles which needs to happen for protein denaturing to fully occur and increases the oxygen flow for combustion to allow the spent grain to be used as the sole fuel source in brewery boilers. In another process disclosed herein, steam is simultaneously injected into the combustion chamber 28 from a steam generator 40 during as the organic particulate material is sprayed within the combustion chamber by the pneumatic stoker.

The above-described process steps reflect the order of steps for processing a spent grain fuel product for combustion as disclosed herein. However, in the case of other fuels, the order of steps for processing the fuel for combustion may differ. For example, in some cases, the step of mechanically removing moisture and other soluble components from the fuel material as described in step 2 may be entirely eliminated.

As previously mentioned, the steps described above may generally be applied to other non-auto-combustible high protein organic materials. These other high protein organic materials include other high protein fermentation by-product materials such as distillers grains, yeast and hops residues, bio-solid waste materials from waste water treatment plants, oil seed pulp often called seed meal, animal excreta, and high protein meat production waste (including meat and bone meal, feathers, feather meal and animal excreta) and other high protein wastes. The waste materials provided herein may also be described as biological waste materials or organic materials or biological materials or as by-products. As is the case for spent grain, these high protein organic materials present combustion challenges which are difficult to overcome due to their respective high protein content. High protein organic materials that are traditionally considered as non-auto-combustible materials which may be used in a process for making a combustible fuel product typically have a protein content of about 10% or greater, on a dry weight basis (DWB) and are ordinarily considered insoluble. In other cases, high protein non-auto-combustible organic materials used for making a combustible fuel product have a protein content of about 20% or greater. High protein fermentation waste and waste by-products processed into a fuel product have a protein content ranging from about 25% to about 40%, on a dry weight basis (DWB). For example, hops residues through processing or concentrating of hops alpha/beta acids and hops oils has a protein content of about 25 to about 30%, on a dry weight basis (DWB). Bio-solids from waste water treatment plants have a protein content ranging from about 10% or greater, on a dry weight basis (DWB) and in some cases from about 20% or greater, on a dry weight basis (DWB). Animal excreta has a protein content ranging from about 20% to about 50% or more, on a dry weight basis (DWB). For example, municipal waste water treatment activated sludge and animal excreta processed into a fuel product can have a large protein content range of about 10% (DWB) to about 60% (DWB) depending upon the specific plant operations. High protein waste from agricultural sources of oil production processed into a fuel product has a protein content ranging from about 20% to about 50%, on a dry weight basis (DWB). For example, the general class of an oil seed pulp meal (e.g., including but not limited to sunflower or rape seed, soy bean, corn, cotton seed, coconut, olive oil, etc.) fuel product has a protein content of about 35%, on a dry weight basis (DWB). Distillers Dried Grains are similar to brewers dried grains but from a distillery also has a protein content of about 30%, on a dry weight basis (DWB). High protein meat production waste and waste by-products processed into a fuel product have a protein content ranging from about 30% to about 85%, on a dry weight basis (DWB). For example, feather waste fuel product has a protein content of about 80% to about 85%. All of these materials are characterized as high protein by-products or waste materials which could be used as fuel products. In each of these alternative fuel types, the degree of hydration and the degree of pulverizing to achieve the appropriate particle size distribution for combustion is dependent upon the respective particles' adhesion characteristics and the protein content which is directly proportional to the nitrogen cross-linking capability at the molecular level. For example, during thermal degradation, the nitrogen bonds in proteins cross link in a macro mechanical way which results in clumping, crusting or clinkering of the fuel product. This restricts oxygen transmission, heat transfer and the diffusion of reaction compounds such as steam into the burning fuel. The low moisture content obtained by process step 3) and the small particle size obtained by process step 1) affects how quickly the temperature of the particle is raised. The process of quickly driving off the moisture and subsequently heating the particles degrades the proteins, denaturing them by essentially having the nitrogen bonds and other cross linking reactions react to complete all of their cross-linking ability on the surface of the particles if not all through the particles while they are agitated in suspension before the particles can touch other particles. Once the cross linking is complete, the particles will no longer adhere to each other. This arrests the particles tendency to adhere to each other via a nitrogen bond cross linkage and through other cross linking reactions. The small particle size obtained from step 1) and the agitation and/or separation applied during step 4) keep the surface to oxygen and injected steam (water vapor) exposure appropriate for oxygen diffusion enabling complete appropriate combustion to be accomplished and for the injected steam (water vapor) to more effectively react with the nitrogen in protein. Steps 1) and 4) work in conjunction to produce a combustible fuel product. For instance, if the small particles were allowed to easily touch during protein thermal degradation, they would form larger clumps that would be glazed over with a cross linked protein layer reducing oxygen and steam diffusion necessary for regulatory compliant emissions during combustion. On the other hand, if the particles were too large to begin with, this would reduce the oxygen availability or diffusion necessary for complete combustion to occur as protein would cross link glazing over the larger particles reducing oxygen and steam (water vapor) diffusion necessary for regulatory compliant emissions during combustion.

Regulatory compliant emissions, are intended to encompass any set of standards established by any governmental regulatory agency to protect the environment. For example, in the U.S., emissions are in certain situations regulated to not exceed 20% opacity averaged over 6 minutes. The combustion process disclosed herein is capable of meeting this regulatory standard as well as other standards set by other agencies and governments of other countries including standards which are more stringent. For example, the combustion process disclosed herein is capable of meeting opacity requirements within time intervals shorter than six minutes, lower opacity levels averaged over 6 minutes, and is also capable of meeting regulations which require specific limits or amounts (e.g., pounds of NOX emissions). The present process can also achieve even lower limits than that which is currently required in the U.S.

As mentioned above, in the case of other high protein organic materials processed to become fuels, the order of steps for processing the fuel for combustion may differ and in some cases, the step of mechanically removing moisture and other soluble components from the fuel material as described in step 2) may be eliminated. For example, in one embodiment, the pulverizing step (i.e., step 1) above) and the drying step (i.e., step 3) above) may need occur in a different order to ensure that fine particles do not re-adhere together during the drying process right before they are fed into the combustion chamber.

To make a fuel product from hops residue, the hops must be processed to extract out oils and desirable compounds. The processing of hops to extract the oils and other desirable compounds leaves a high protein residue. In order to process the hops, a hops processor first dries the hops to obtain dry hops cones. Next, the dry hops cones are ground. Then, the hops is subjected to an extraction such as a $CO_2$ extraction or other mechanical separation technique known within the art to remove or concentrate the essential oils and other desirable compounds. Various types of extraction methods may be used in this process including but not limited to normal $CO_2$ extraction processes, $CO_2$ triple point extraction processes as well as other mechanical separation techniques suitable for use within the art. The separation and/or extraction process allows the desirable compounds to be removed or extracted from the hops, creating a by-product or hops residue waste material. In certain cases, after the waste or hops residue is removed or extracted, it may need to be re-ground. In some embodiments, the hops residue is dried and pre-ground but due to processing may reform into larger particle groupings that will need to be re-ground to a powder. After processing the hops residue for combustion, the hops residue may be agitated and/or separated as described above during the combustion phase to separate particles of the fuel product to inhibit their cohesion into an integrated mass. In certain embodiments, the separation step during the combustion phase is accomplished through the use of a pneumatic stoker. In other embodiments, the agitation step during the combustion phase is accomplished through the use of a vibrating grate. As described above, the process steps for making a fuel product from hops residue may occur in any order.

To make a fuel product from biological waste material, one can process municipal waste water treatment activated sludge waste, which is a human bio-hazard. This biological waste material starts off very wet (approximately 99% water). This first step is therefore to dewater the biological waste material as much as possible using flocking agents, centrifuges and dewatering separators. The biological waste material will then be dried typically on a heated rotating drum, a heat progressing filter belt, drum filter or other suitable drier. This results in dry flakes or pellets having less than 10% moisture which are too large and which will need to be pulverized. Thus, the processing of biological waste material into a fuel product requires the following steps: 1) mechanical removal of water, moisture and other soluble components from the biological waste material; 2) drying the biological waste material to reduce the moisture content to 10% or less by weight; 3) pulverizing the biological waste material to reduce the particle size to be less than 2 mm; and 4) agitating and/or separating the biological waste material as described above during the combustion phase to separate particles of the biological waste material to inhibit their cohesion into an integrated mass and 5) simultaneously injecting steam within the combustion chamber. The combustion process may occur within an integrated steam boiler, an incinerator, furnace or any other type of combustion chamber typically used by those of skill in the art to generate heat. In certain embodiments, the separation during the combustion phase is accomplished through the use of a pneumatic stoker. In other embodiments, the agitation step during the combustion phase is accomplished through the use of a vibrating grate or a combination of both a pneumatic stoker and a vibrating grate. It is noted that step 2) uses any means within the purview of an individual of suitable skill in the art to remove free water. Also, the high water content of the biological waste material requires the application of additional heat to the waste material in the drying step. In general, municipalities have an interest in applying the disclosed process not only for heat generation but more importantly, in order to dispose of bio-hazardous material via combustion. In addition, the dried waste product has a higher value as fuel than as other means of disposal. For example, use of land application for disposing biological waste material (if regulations allow) has a much lower revenue value to a municipality than the value that would be obtained if the biological waste material were to be used as a fuel for the production of heat.

To make a fuel product from animal excreta, one can process the animal excreta in a manner similar to the process steps described above with respect to biological waste material. Animal excreta, is a bio-hazard which also starts off very wet. This fecal material is first dewatered using thickeners, flocking agents, presses, centrifuges and dewatering separators to separate out the settable solids. Next, the settable solids are dried on commonly available industrial drying equipment such as a belt or drum drier. The resulting dry flakes or pellets are then pulverized. Thus, the processing of animal excreta into a fuel product requires the following steps: 1) mechanical removal of water, moisture and other soluble components from the animal excreta; 2) drying the animal excreta to reduce the moisture content to 10% or less by weight; 3) pulverizing the animal excreta to reduce the particle size to be less than 2 mm; and 4) agitating and/or separating the animal excreta as described above during the combustion phase to separate particles of the animal excreta to inhibit their cohesion into an integrated mass and 5) simultaneously injecting steam within the combustion chamber to assist in the combustion reactions and to maintain regulatory compliant combustion based upon the exact nature of the organic materials. In certain embodiments, the separation step during the combustion phase is accomplished through the use of a pneumatic stoker. In other embodiments, the agitation step during the combustion phase is accomplished through the use of a vibrating grate. It is noted that step 2) uses any means within the purview of an individual of suitable skill in the art to remove free water. Also, the high water content of the biological waste material requires the application of additional heat to the waste material in the drying step. This process may be applied by farms to not only generate some form of heat recovery but as importantly, to dispose of a bio-hazardous material rather than holding it until growing season for land application as fertilizer (farms hold this material for up to a full year). The benefit of employing this process is that the value of the waste stream as an energy source is much more significant than its value as a soil enhancement. Additional benefits of employing this process include reducing foul odor and reducing the liability for having exposed standing waste ponds which are regulated stringently by the regulatory agencies.

Oil seed pulp meal streams have a fairly high heating value. To make a fuel product from a high protein waste from an agricultural source of oil production such as oil seed pulp meal, the oil seed pulp meal undergoes a seed oil extraction. In the extraction process, high protein residue is separated from the oil and the pulp waste material (often called seed meal which maybe already dry (shelf stable)) and ground ready for animal feed processing. Additional drying and pulverizing steps may be applied to the oil seed pulp meal material as described above as deemed necessary. For example, in certain embodiments, the oil seed pulp meal material may be dried to reduce the moisture content to 10% or less by weight and then pulverized or in reverse order to reduce the particle size to be less than 2 mm. The oil seed pulp meal material is then agitated and/or separated as described above during the combustion phase to separate particles of the oil seed pulp meal material to inhibit their cohesion into an integrated mass while simultaneously injecting steam within the combustion chamber to assist in the combustion reactions and to maintain regulatory compliant combustion based upon the exact nature of the organic materials. The grinding step may occur immediately after the extraction step or may occur after a drying and pulverizing as described above. In certain embodiments, the separation step during the combustion phase is accomplished through the use of a pneumatic stoker. In other embodiments, the agitation step during the combustion phase is accomplished through the use of a vibrating grate. The pneumatic stoker and the vibrating grate may also be used together.

To make a fuel product from a high protein fermentation waste such as distillers grains, one would follow the process described above with respect to the processing of brewery spent grains. In this regard, distillers dried grains and any grains from the fermentation industry are regarded by those of skill in the art to be similar to those of brewers dried spent grains. In addition, the process described above may also be applied to other types of high protein waste.

To make a fuel product from high protein meat production waste and waste by-products such as meat and bone meal, feathers, feather meal and excrement (animal excreta), one may process the by-products or waste material by cooking and milling to stabilize the product so that it can be made into a feed supplement. One would then follow the general process described above with respect to other high protein organic waste materials.

In each of the processes described above with respect to high protein bio-solids from waste water treatment plants; high protein animal excreta; high protein fermentation waste and waste by-products; high protein waste from agricultural sources of oil production, high protein waste by-products and high protein by-products; and high protein meat production waste by products and by-products, the separation step during combustion may be applied by a pneumatic stoker or by an auger which drops the grain onto a vibrating bed and transfers the fuel product to the combustion chamber through an incline or a combination of both. However, by blowing or spraying the particles into the combustion chamber, the pneumatic stoker keeps the particles separated in the combustion chamber long enough to allow the heat transfer provided by the combustion process to quickly dry the particles out and to degrade the proteins and other compounds within the combustible fuel product. This prevents nitrogen-based cross linking and other non-nitrogen based cross-linking reactions. Examples of non-nitrogen based cross linking reactions include cross linking of carbohydrates (these can include simple sugars to more complex dextrins) during thermal decomposition between the particles that would result in the particles adhering to each other. This unique feature for addressing cross linking and then also degrading proteins with steam is not considered by combustion technologists and therefore not addressed in traditional feeding mechanisms of potential non-auto combustible fuel into the combustion chamber.

As mentioned above, the combustion process provides for both quickly driving off the moisture and subsequently heating the particles to denature the proteins. Although the timing of these events occurs relatively quickly for the particles to be fully dehydrated for combustion, the process also requires the input of water into the combustion chamber in order to facilitate certain chemical combustion reactions within the combustion chamber. In short, there are four sources for introducing water within the combustion chamber. Those sources include water within the combustion air which supports the combustion process, water within the particle itself that is to be combusted, the combustion reactions which generate water and steam which is injected into the combustion chamber. By controlling the amount of water that is introduced within the combustion chamber from these four sources, the temperature of the combustion process can be controlled and combustion reactions can be influenced to maintain regulatory compliance in order to utilize otherwise non-auto-combustible high protein organic material or waste product or by-product as a fuel. Water produced during combustion is basically the result of oxidation of hydrocarbons which primarily produce carbon dioxide and water. Water is also an active part of many intermediate combustion reactions. The majority of water in traditional combustion comes from the fuel combustion reaction products and a much smaller amount which comes from the water in the fuel itself (assuming this water concentration is 10% moisture or less) and from the humidity in combustion air. In the disclosed process, a significant amount of water in the form of steam is comparable to the amount produced due to combustion is injected into the combustion chamber. In certain aspects of the present disclosure, the amount of water (i.e., steam) injected into the combustion chamber in the form of steam may be equivalent or nearly equivalent to the amount produced during normal combustion. Under certain operating conditions, by injecting a nearly stoichiometric equivalent amount of water in the form of steam, the reaction kinetics are affected to influence the balance of the products verses the reactants in the combustion reaction itself. However, in other aspects of the present disclosure, it may not be necessary to inject an equivalent, stoichiometric equivalent or nearly stoichiometric equivalent amount of water or steam within the combustion chamber to achieve the desired results as injecting such an amount of water or steam into the combustion chamber may not assist and/or may hinder combustion under certain conditions. In addition, it is also noted that the reaction of nitrogenous hydrocarbons (e.g., intermediate ammonium and other nitrogen containing compounds) compounds assists in gasifying the nitrogen from protein thermal combustion products that aids in NOX control and reduction.

Without steam injection, the water content in the combustion chamber could be less than 8% due to the water in the fuel, less than 15% could be from water contained in the combustion air and over 77% could be from the combustion reactions. With steam injection comparable to the combustion water source, these ratios change to less than about 4% of the water being from the fuel, less than about 8% of the water being from the combustion air, about 44% of the water being from combustion sources and about 44% of the water being from direct steam injection.

While steam is used in traditional combustion to mechanically move and manage ash transport in combustion chambers, to lower temperatures and to effect coal gas reactions (CO and CH4), the use disclosed herein is unique in its effect on the nitrogen content of the high protein organic waste materials. In particular, the combustion reactions disclosed herein do not produce high NOX levels compared to other readily combustible fuels. For example, coal may contain an elevated nitrogen content of 2% nitrogen as pyridine (which is far lower than the levels of nitrogen present within organic wastes) but results directly in elevated NOX levels which results directly in unacceptable NOX levels which exceed that of the use of organic wastes disclosed herein.

This regulatory combustibility of traditionally non-auto-combustible waste products is achieved by influencing the temperature of the combustion which also influences the amount of NOX (Nitrogen Oxides) production during the combustion process. Through the introduction of steam within the combustion chamber, the temperature of the combustion chamber can be controlled, nitrogenous hydrocarbons compounds are reacted with water and combustion reactions can be influenced so that elevated amounts of NOX production does not occur. This provides additional agitation which also provides additional time for the particles to heat up allowing nitrogen cross-linking and other cross linking reactions within the particles to occur before ignition and combustion. Accordingly, the injection of steam within the combustion chamber allows one to control the combustion process between various types of high protein organic materials providing optimal conditions for combusting high protein organic materials that are typically not auto-combustible.

In addition to injecting steam within the combustion chamber, in certain aspects of the process disclosed herein, it may be desirable to increase the protein content of the high protein organic material before it enters the combustion chamber. This may be accomplished by injecting a secondary high protein organic material such as yeast, precipitated proteins, spent hops or other high protein materials within the high protein organic material before it is pulverized (ground) and/or before it is dried. For example, the addition of yeast may be added to increase the protein content of wet spent grain before it enters the drier.

The process described above allows for the effective combustion of high protein organic materials (e.g., biosolids from waste water treatment plants; animal excreta; high protein fermentation waste and waste by-products; high protein waste from agricultural sources of oil production waste by-products and by-products; and high protein meat production waste and waste by-products) which allows for a specific type of high protein organic material to be used as the primary sole source of fuel. While these wastes or by-products may be incinerated and burnt without undergoing the process described above, combustion can only occur when the majority of the energy comes from traditional auto-combustible fuels like wood products and wood by-products; hydrocarbons like natural gas, coal and fuel oil. The process disclosed herein eliminates any need to combine the high protein organic material with a readily combustible fuel source such as wood, wood chips, wood by-products, coal, fuel oil, natural gas, coal or other combustibles or additives to aid in combustion. The process disclosed herein further allows the high protein organic material to undergo combustion within a furnace, steam boiler, incinerator or other combustible chamber as a primary or as a sole fuel source.

The above-described process can be described in the following five steps: 1) pressing the fuel material to mechanically remove moisture and other soluble components; 2) drying the fuel material to reduce the moisture content to 10% or less by weight; 3) pulverizing the fuel material to reduce the particle size to be generally in the range less than 2 mm; 4) agitating and/or separating the fuel product during the combustion phase to separate particles of the fuel product to inhibit their cohesion into an integrated mass; and 5) injecting steam within the combustion chamber to enhance the combustibility of the spent grain and to regulate the nitrogenous hydrocarbon combustion reactions related to the organic nitrogen contained in the proteins or otherwise high protein non-combustible organic material. Although the order of steps generally follows the sequence of steps mentioned above, in certain embodiments, the pulverizing step (step 1) may occur after the drying step (step 3) but prior to combustion (step 4).

With respect to the combustion of these examples of high protein biological materials as fuel products, one might assume that these fuel products would have abnormally high NOX (Nitrogen Oxides) emissions due to the high protein and organic nitrogen content of these fuels. In fossil fuels, even a slightly elevated nitrogen content results directly in elevated NOX production. However, the present process does not result in elevated NOX formation. Rather, the present process results in emissions which are within the normal regulatory compliant range of NOX production for typical low nitrogen fossil fuels, generally in the range of 100 ppm to 135 ppm NOX. This is due to the relatively weak binding of nitrogen to the carbon-based proteins and its combustion reactions with excess water provided for in the present process by steam injection. In essence, the chemical path of protein thermal decomposition allows the nitrogen to take an intermediate step to form urea, ammonium compounds and even ammonia in the present process. It is noted that ammonia is sometimes injected into combustion furnaces for boilers to lower NOX production. This is represented by the following generically balanced general chemical formula: $aNH_3$ (ammonia)+bNOX (nitrogen oxides) $=cN_2$ (nitrogen)+$dH_2O$ (water). Where a, b, c and d will vary numerically based upon the actual form that the NOX takes. The present process does not necessarily require the partial injection of ammonia into the combustion chamber due to the type of organic protein combustion reactions which occurs during the process which include the generation of nitrogenous hydrocarbons (e.g., intermediate ammonium and other nitrogen containing compounds). In any event, the presence of the weak nitrogen bonded protein generates ammonia and other nitrogenous hydrocarbon compounds formed in the present process within the combustion chamber which allows combustion of high nitrogen content fuel to be used without higher NOX production. Accordingly, the present disclosure also encompasses a process for making a combustible fuel product from a non-auto combustible high protein biological material used as an additive with injected steam for a combustion system to enable having a lower NOX production wherein protein thermal decomposition by-products are allowed to react with nitrogen oxides (NOX) within the combustion chamber to form water ($H_2O$) and nitrogen ($N_2$). A general summary of the process for making a combustible fuel product from a high protein organic material that is non-auto-combustible is illustrated within FIG. 2. First the high protein organic material is crushed or pulverized by a mill 10 to reduce the material to a finely ground particle size. The term "mill" is intended to include a roller mill, a hammer mill, any type of grinder and any type of particle reduction process that a person of ordinary person of skill in the art would utilize to reduce the particle size of materials. After pulverizing, the high protein organic material is moved to a vessel 12 and subsequently moved to a filter press 14 (or any mechanical water separator) where it is pressed to mechanically remove water and other liquids from the material. It is noted that any means known to those of skill in the art may be utilized to mechanically remove water and other liquids from the material. The high protein organic material is then moved to a hopper 16 by a pneumatic pump and subsequently subjected to a drier 18 to further remove water, liquid and moisture from the material. The high protein organic material is separated from the air vapor mixture by a cyclone 24, for example, and is then moved to a hopper 20. For combustion with the boiler 22 (e.g., a steam boiler), the high protein organic material is moved in a suitable manner from the fuel bin by a spraying device such as a pneumatic stoker (34) into the combustion chamber 28. In another process, steam is injected into the combustion chamber 28 from a steam generator 40 while simultaneously spraying high protein organic material within the combustion chamber. After combustion, waste ash is collected and disposed of. The above described process illustrated within FIG. 2 for producing a combustible fuel product from a high protein organic material is intended to be a generalized description of the overall process. It is to be understood that variations, modifications and rearrangements of the components shown within FIG. 2 may be necessary such as in the case of producing a combustible fuel product from a high protein biological material from oil seed pulp meal as described within this document. For oil seed pulp meal, an extractor may be incorporated at the front end of the process to remove residue oils from the oil seed pulp meal before drying and subsequently pulverizing the oil seed pulp meal. Furthermore, because the drying and pulverizing steps may be optional with respect to oil seed pulp meal, it may not be necessary to include a mill 10 and/or a dryer 18 within the process in certain cases. It should be noted that with certain high protein organic materials, parts of the process described in FIG. 2 will not be necessary as the by-product may already be partially processed as received. For example, in the case of meat and bone meal, feathers, feather meal, oil seed pulp residue, all of these items may already be dried (pre-processed) to have or already have less than 10% moisture, eliminating the need for the Filter Press 14 and the Drier 18 (i.e., mechanical removal of moisture of these materials may not be necessary). Also, the process and order of steps described within FIG. 2 may vary depending on the type of high protein non-auto-combustible organic material that is being utilized. For example, with respect to biological waste material originating from waste water treatment sludge, it may be necessary to first subject the biological waste material to a drier to reduce the moisture content before subjecting the biological waste material to a mill 10 for pulverization.

Although certain specific steps and devices for performing the steps of the process of the present disclosure have been disclosed above, it will be apparent to one of ordinary skill in the art that other steps and devices may be used without departing from the scope of the present disclosure indicated in the appended claims. It will also be apparent that the present disclosure may be applied to other types of high protein non-auto-combustible organic materials. It will also be apparent that the present disclosure may be applied to other processes, in addition to those disclosed herein. For example, in addition to Brewers Spent Grains (termed BDG in the art) described above, the present disclosure may be applied to Distillers Spent Grain (DDG) and any fermentation process of grains that produce alcohol.

We claim:

1. A process for making a combustible fuel product from a non-auto-combustible organic material for a combustion system having a low nitrogen oxides (NOX) production amount and a low emissions opacity comprising the following steps:
   1) providing a non-auto-combustible organic material, wherein the organic material is a high protein organic material having a protein content of about 10%, on a dry weight basis (DWB) or greater;
   2) optionally mechanically removing liquid and soluble components from the high protein organic material;
   3) optionally applying heat to dry the organic material to reduce its moisture content to ten percent (10%) or less by weight;

4) pulverizing the high protein organic material to reduce the high protein organic material to a particle size of less than 2 mm;
5) separating particles of the high protein organic material during a combustion phase to inhibit their cohesion into an integrated mass by spraying the particles into a combustion chamber;
6) simultaneously injecting steam into the combustion chamber to enhance combustion characteristics of the high protein organic material; and,
7) allowing protein thermal decomposition by-products to react with nitrogen oxides (NOX) within the combustion chamber to form water ($H_2O$) and nitrogen ($N_2$), wherein the nitrogen oxides (NOX) production ranges from about 100 parts per million (ppm) to about 150 parts per million (ppm) and wherein the opacity of the emissions is about 20% or less on average for every 6-minute interval,
wherein the pre-combustion steps of 2) optionally mechanically removing liquid and soluble components from the high protein organic material, 3) optionally applying heat to dry the organic material to reduce its moisture content to ten percent (10%) or less by weight and, 4) pulverizing the high protein organic material to reduce the high protein organic material to a particle size of less than 2 mm may occur in any order.

2. The process defined in claim 1, wherein pulverizing, pressing, applying heat to dry the high protein organic material particles, spraying particles into the combustion chamber and injecting steam into the combustion chamber degrades the proteins contained within the particles and denatures them by allowing nitrogen cross-linking and other cross-linking reactions to occur within the particles, allowing the particles to complete all of the cross-linking ability before the particles contact other particles.

3. The process defined in claim 2, wherein cross-linking of the high protein organic material particles is prevented by prematurely initiating cross-linking reactions of the nitrogen bonds and other cross linking reactions while the particles are being agitated and wherein the high protein organic material particles no longer adhere to each other, thereby arresting the particles tendency to adhere to each other within the combustion chamber via nitrogen bond cross-linkage and other cross-linkage reactions.

4. The process defined in claim 3, wherein the step of separating the high protein organic material by spraying the processed high protein organic material into the combustion chamber is effected through use of a pneumatic stoker.

5. The process defined in claim 4, wherein spraying the particles of the high protein organic material into the combustion chamber by the pneumatic stoker keeps the particles separated in the combustion chamber long enough to allow heat transfer provided by the combustion process to quickly dry and then degrade proteins present within the high protein organic material and to prevent nitrogen cross linking and other cross linking reactions between the particles that would have the particles adhere to each other.

6. The process defined in claim 5, wherein the particles of the high protein organic material are separated and dispersed within the combustion chamber and ignited and burned while in suspension and separated from each other before they land and adhere to each other.

7. The process defined in claim 6, wherein the non-autocombustible high protein organic material is rendered combustible without the addition of other combustible fuels or additives.

8. The process defined in claim 7, wherein protein thermal decomposition by-products include ammonia, nitrogenous hydrocarbons and nitrogen-based compounds and wherein injection of ammonia, nitrogenous hydrocarbons and nitrogen-based compounds into the combustion chamber is not required to lower NOX production.

9. The process defined in claim 8, wherein the step of mechanically removing liquid and soluble components from the high protein organic material further comprises the use of flocking agents, centrifuges, filter beds and dewatering separators.

10. The process defined in claim 9, wherein the high protein organic material is a biological waste or by-product material.

11. The process defined in claim 10, wherein the biological waste or by-product material originates from waste water treatment activated sludge waste and wherein the process comprises the following order of steps:
1) providing a biological waste material or by-product comprising a waste water treatment activated sludge having a protein content of about 10% or greater, on a dry weight basis (DWB);
2) removing water, moisture and other soluble components from the biological waste material or by-product;
3) drying the biological waste material or by-product to reduce the moisture content to 10% or less by weight;
4) pulverizing the biological waste material to reduce the particle size to be less than 2 mm; and
5) separating particles of the biological waste material or by-product during the combustion phase to inhibit their cohesion into an integrated mass by spraying the particles into the combustion chamber and
6) simultaneously injecting steam into the combustion chamber, wherein steam is injected to modify and control combustion reactions by reacting with nitrogen within proteins to form intermediate nitrogenous-based protein thermal combustion products which help to maintain regulatory compliance of combustion emissions.

12. The process defined in claim 11, wherein the step of removing of water from the biological waste material or by-product comprises application of heat.

13. The process defined in claim 12, wherein the step of drying biological waste or by-product material comprises drying the biological waste material or by-product in a heated drier, a heated progressing filter belt or other suitable drier and wherein the step of pulverizing the biological waste material or by-product comprises subjecting the biological waste material or by-product to a mill.

14. The process defined in claim 11, wherein the high protein biological waste material or by-product is pulverized prior to drying to ensure that the high protein biological waste material has a particle size less than 2 mm.

15. The process defined in claim 10, wherein the high protein biological waste material is hops residue and wherein the process for making the combustible fuel product from hops residue comprises the following steps in the following order:
1) extracting oils and other compounds from the ground hops utilizing mechanical separation techniques or CO2 extraction to obtain a high protein hops waste residue having a protein content of about 25 to about 30 weight percent, on a dry weight basis (DWB);
2) providing the hops waste residue;
3) drying the hops waste residue;

4) grinding the hops waste residue into a powder by pulverizing the hops waste residue to ensure that particles of the hops waste residue have a particle size of less than 2 mm;

5) agitating the hops waste residue during a combustion phase to separate particles of the hops waste residue by spraying the particles into the combustion chamber to inhibit their cohesion into an integrated mass and 6) simultaneously injecting steam into the combustion chamber to enhance the combustibility of the high protein organic material.

16. The process defined in claim 15, wherein the step of pulverizing the hops waste residue includes subjecting the hops residue to a mill and wherein the step of drying the hops waste residue comprises the application of heat.

17. The process defined in claim 10, wherein the high protein organic material is a high protein waste or meal from an agricultural source of oil production, waste by-products and by-products from an oil seed pulp processing.

18. The process defined in claim 17, wherein the biological waste material comprises an oil seed pulp waste residue, further wherein the process for making a combustible fuel product from oil seed pulp waste residue comprises the following order of steps:

1) obtaining an extracted high protein oil seed pulp waste residue having a protein content of about 35%, on a dry weight basis (DWB), a moisture content of ten percent (10%) or less and a particle size less than 2 mm, wherein oil from the oil seed pulp waste residue may or may not be preliminarily extracted; and 2) separating and agitating particles of the oil seed pulp waste residue during the combustion phase to inhibit their cohesion into an integrated mass while simultaneously injecting steam into the combustion chamber.

19. The process defined in claim 17, further comprising drying and pulverizing the oil seed pulp waste residue to ensure a moisture content of ten percent (10%) or less and a particle size of less than 2 mm.

20. The process defined in claim 1, wherein the high protein organic material is one of a high protein animal excreta or a high protein animal meat processing by-product or waste and wherein the process comprises the following steps:

obtaining a pre-processed or "as is" high protein animal excreta or high protein animal meat processing by-product or waste which is non-auto-combustible, wherein the animal excreta has a protein content ranging from about 20% to about 60%, on a dry weight basis (DWB) and the animal meat processing by-product or waste has a protein content ranging from about 35% to about 85% dry weight basis.

\* \* \* \* \*